United States Patent [19]

Miura

[11] 4,082,876
[45] Apr. 4, 1978

[54] METHOD FOR PRODUCING FOAMED BODY HAVING CHEMICAL EMBOSSED PATTERNS AND RESULTANT PRODUCT

[75] Inventor: Nobuo Miura, Kashiwa, Japan
[73] Assignee: Lonseal Corporation, Tokyo, Japan
[21] Appl. No.: 659,104
[22] Filed: Feb. 18, 1976
[30] Foreign Application Priority Data
  Feb. 20, 1975  Japan .................. 50-21655
[51] Int. Cl.² ............................ B29D 27/00
[52] U.S. Cl. ...................... 428/159; 264/52; 264/54; 264/DIG. 18; 264/DIG. 82
[58] Field of Search ........ 264/DIG. 82, 52, DIG. 18, 264/54; 428/158, 159, 160; 427/256, 275

[56] References Cited
U.S. PATENT DOCUMENTS

| | | | |
|---|---|---|---|
| 3,365,353 | 1/1968 | Witman | 264/DIG. 82 |
| 3,453,171 | 7/1969 | Crowley | 264/DIG. 82 |
| 3,519,527 | 7/1970 | Crowley | 264/DIG. 82 |
| 3,538,204 | 11/1970 | Grubb et al. | 264/DIG. 82 |
| 3,800,013 | 3/1974 | Allan | 264/52 |
| 3,804,933 | 4/1974 | Allan et al. | 264/52 |
| 3,819,438 | 6/1974 | Witman | 264/52 X |
| 3,823,214 | 7/1974 | Allan et al. | 264/52 |
| 3,857,915 | 12/1974 | Crowley | 427/256 X |

OTHER PUBLICATIONS
Perry, Robert H., Chief Editor, and Cecil H. Chilton, Consultant, "Chemical Engineer's Handbook", Fifth Edition, New York, McGraw-Hill, © 1973, pp. 19–17.

*Primary Examiner*—Philip Anderson
*Attorney, Agent, or Firm*—Oblon, Fisher, Spivak, McClelland & Maier

[57] ABSTRACT

Methods for producing bodies having chemically embossed patterns comprise: (1) adding sulphur and synthetic rubber material capable of forming sulphur bridges to a vinyl chloride resin preparation containing a foaming agent, forming the mixture into a sheet, printing embossed patterns on the sheet using an ink containing a vulcanization accelerator, drying the printed sheet and then heating the sheet to decompose the foaming agent thereby foaming the sheet; and (2) adding synthetic rubber material containing terminal groups capable of reacting with isocyanates to a vinyl chloride resin preparation containing a foaming agent, forming the mixture into a sheet, printing embossed patterns on the sheet using an ink containing isocyanates, drying the printed sheet and then heating the sheet to decompose the foaming agent thereby foaming the sheet.

6 Claims, 2 Drawing Figures

METHOD FOR PRODUCING FOAMED BODY HAVING CHEMICAL EMBOSSED PATTERNS AND RESULTANT PRODUCT

BACKGROUND OF THE INVENTION

1. Field of the Invention

This invention relates to a process for preparing a foamed body having chemically embossed patterns.

2. Description of the Prior Art

In general, there are two methods for forming embossed patterns. One is the so-called "ballet" printing method in which embossing is effected simultaneously with printing, and the other is the so-called chemical-embossing method. Many proposals have been made particularly with regard to the latter method.

U.S. Pat. No. 3,293,094 and Japanese Patent Publication No. 43-28636, for example, disclose methods for producing embossed patterns in which the surface of a sheet of an unfoamed resin composition containing a foaming agent, is printed with an ink which contains a decomposition inhibitor. The latter ingredient inhibits the decomposiition of the foaming agent, so that the decomposition process at the printed surfaces is retarded whereby embossed patterns are produced.

Japanese Patent Publication No. 43-15713 discloses a method for producing printed chemically embossed patterns in which a sheet of an unfoamed resin composition containing a foaming agent is printed with an ink which contains substances serving to lower the decomposition temperature, such as a so-called "kicker" and the like. As a result, the foaming process at the printed surfaces is accelerated resulting in an embossing effect.

In addition, U.S. Pat. No. 3,804,933, and Japanese Laid-Open Patent Applications No. 48-84158 and 49-105853 disclose methods for producing printed chemically embossed patterns which utilize sheets of a monomer having unsaturated bonds or of an unfoamed resin composition containing a reactive plasticizer and a foaming agent. The surfaces of these sheets are printed with an ink containing peroxides or amines whereby the printed products are inhibited from foaming, resulting in production of embossed patterns.

However, the methods of the first three mentioned references require extreme control on the heating conditions used to decompose the foaming agent. Moreover, the methods of the last three mentioned references suffer from the disadvantage that evenness of the sheet is not assured because the surface finish depends greatly upon the degree of bridging in the composition. As a result, it is difficult to obtain a uniform sheet. Furthermore, since the thickness of the sheet is not constant or uniform, the printed portions often are discolored, e.g., are whitened, and become cracked. Consequently, there continues to exist a need for improved techniques for chemically embossing foamed compositions.

SUMMARY OF THE INVENTION

Accordingly, it is an object of the present invention to provide a method for chemically embossing a foamed composition whereby whitening and cracking of the surface does not occur, the conditions of control are suitable for industrial purposes and a uniform surface is obtained.

Briefly, this and other objects of this invention as will hereinafter be made clear have been attained by providing a first method for producing a foamed body having chemically embossed patterns which comprises adding sulphur and synthetic rubber material capable of forming sulphur bridges to a vinyl chloride resin preparation containing a foaming agent, forming the mixture into a sheet, printing embossed patterns on the sheet using an ink containing a vulcanization accelerator, drying the printed sheet and then heating the sheet to decompose the foaming agent thereby foaming the sheet and a second method for producing a foamed body having chemically embossed patterns which comprises adding synthetic rubber material containing terminal groups capable of reacting with isocyanate to a vinyl chloride resin preparation containing a foaming agent, forming the mixture into a sheet, printing embossed patterns on the sheet using an ink containing isocyanates, drying the printed sheet and then heating the sheet to decompose the foaming agent thereby foaming the sheet.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DESCRIPTION OF THE PREFERRED EMBODIMENTS

The process of this invention differs from the conventional methods in that it remarkably raises the melt viscosity at the printed portions of the composition to be foamed whereby whitening and cracking do not occur. There is achieved by adding rubber-like materials to the composition so that when the foaming agent is decomposed by the heat, the printed portions become viscous. More particularly, according to this invention, there is provided a process for producing chemically embossed patterns which comprises mixing an appropriate synthetic rubber, which is highly compatible with vinyl chloride resin, with vinyl chloride resin plasticizer, stabilizer, lubricant, foaming agent, other desirable conventional additives and also sulphur, if necessary; forming them into a sheet; printing on the surface of the unfoamed sheet an ink containing a vulcanization accelerator or an isocyanate, whereby the accelerator or the isocyanate permeates into the sheet at the printed portions permitting the formation of bridges in the synthetic resin and thereafter heating the composition to the decomposition temperature of the foaming agent, thereby producing a foamed sheet and obtaining printed chemically embossed patterns.

Suitable synthetic rubber resins compatible with vinyl chloride resin include a sulphur bridging type and an isocyanate bridging type. First, the process using the sulphur bridging resin will be explained.

Figure 1:
FIG. 1 is a section of an unfoamed sheet.
Figure 2:
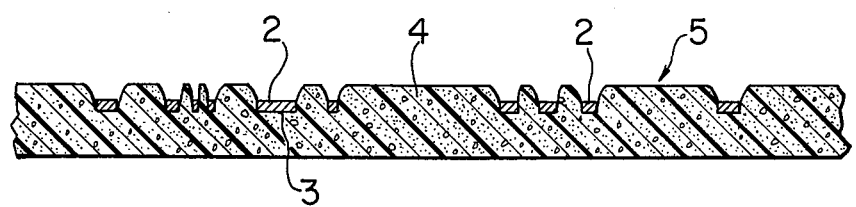
FIG. 2 is a foamed sheet having embossed patterns.

Referring to FIG. 1, a sheet 1 is first prepared by blending vinyl chloride resin, plasticizer, stabilizer, pigment, lubricant, foaming agent, sulphur, synthetic resin and other desirable additives. The surface of the sheet 1 is printed with an ink 2 containing a vulcanization accelerator. The accelerator permeates into the sheet at the printed portions causing bridging in the synthetic rubber material located beneath the printed sections. Referring to FIG. 2, when the synthetic rubber is heated to the decomposition temperature of the foaming agent, the melt viscosity at the bridged portions 3 is higher than that at the non-bridged portions 4 due to the difference in molecular structure. Therefore, the number and size of the foam cells produced at the bridged portions 3 are much smaller than those for the foam cells produced at the non-bridged portions. For this reason, the sheet 5 obtained contains regions of differing height. The printed portions are concave and the non-printed portions are convex resulting in formation of chemically embossed patterns.

Referring also to FIG. 1, the process using isocyanate bridges will be discussed. Vinyl chloride resin, plasticizer, stabilizer, pigment, lubricant and synthetic rubber containing isocyanate reactive terminal groups are first mixed and formed into a sheet. The surface of the sheet 1 is printed with an ink 2 containing isocyanate groups. The isocyanate permeates into the sheet composition and causes the formation of isocyanate bridges in the areas of the sheet located beneath the printed portions. When the composition is heated to the decomposition temperature of the foaming agent, as is the case with the sulphur bridge process, the melt viscosity at the non-bridged portions 3 is higher than that at the non-bridged portions 4 due to the difference in molecular structure. Therefore, the foam cells produced at the bridged portions 3 are more minute and are smaller in number than are those produced at the non-bridged portions 4. As a result, the bridged portions do not swell as do the non-bridged portions. For this reason, the sheet 5 obtained contains regions of differing heights. The printed portions are concave and the non-printed portions are convex, resulting in the formation of chemically embossed patterns.

Suitable synthetic rubber materials which are compatible with vinyl chloride resins and are capable of making sulphur bridges, include acrylonitrilebutadiene rubber, chloroprene rubber, chlorosulfonated polyethylene and the like. Suitable vulcanization accelerators for use in the ink include thiazoles such as 2-mercaptobenzothiazole, thiurams such as tetramethylthiuramdisulfide, dithiocarbamates such as piperidine.pentamethylene.dithiocarbamate, xanthates such as dibutyl.zinc.xanthate, and mixtures thereof. Suitable synthetic rubber materials which are compatible with vinyl chloride resins and which have reactive terminal groups include butadiene, NBR liquid rubber having terminal OH groups, butadiene-styrene copolymers, and butadieneacrylonitrile copolymers having reactive terminals (such as OH groups) and the like. Suitable isocyanates for use in the ink include toluene.diisocyanates, (such as 2, 4 toluene diisocyanate(Demodur T)) diphenylisocyanate, aliphatic polyisocyanates, low molecular weight prepolymers having isocyanate terminal groups, polymethylene polyphenyl isocyanates (millionate MR), polyfunctional aliphatic isocyanates and the like.

The amount of the synthetic rubber is preferred to be in the range of 20–60 wt. parts per 100 wt. parts of the vinyl resin while the amount of sulphur should be 1–2 wt. parts per 100 wt. parts of the synthetic rubber. The amounts of the vulcanization accelerator or isocyanates to be added to the ink are 7–30 wt. percent and 3–30 wt. percent, respectively. It is of course to be realized that the specific inks, additives for the foaming composition, and vinyl resins to be utilized are not critical and are entirely conventional.

These selections can be made according to the specific properties desired in the final product using well-known conventional considerations.

Having generally described the invention, a more complete understanding can be obtained by reference to certain specific examples, which are included for puposes of illustration only and are not intended to be limiting unless otherwise specified.

The following ingredients were mixed in a "Bambury" mixer, and were treated with a mixing roll to obtain a uniformly mixed composition.

EXAMPLE 1

|  | Parts By Weight |
| --- | --- |
| Vinyl chloride resin ($\bar{p}$ = 800) | 100 |
| Phthalic acid ester plasticizer | 400 |
| Phosphoric acid ester plasticizer | 25 |
| Acrylonitrile-butadiene copolymer rubber (NIPOL 1042) | 30 |
| Ba - Ca system stabilizer | 5 |
| Sulphur | 0.5 |
| Azodicarbonamide foaming agent | 3 |
| $TiO_2$ | 10 |

The resulting composition was rolled by a calender roll to a thickness of 0.5 mm and the film obtained was affixed to a paper sheet. Gravure printing was then effected on the paper coated with the film, by means of an ink containing the following ingredients:

|  | Parts By Weight |
| --- | --- |
| Vinyl chloride resin (Geon 400 × 150 ML) | 100 |
| Phthalic acid ester plasticizer | 30 |
| Phosphoric acid ester plasticizer | 10 |
| Epoxy resin plasticizer | 5 |
| Ca - Ba system stabilizer | 5 |
| Methyl-ethyl ketone | 200 |
| Mineral Spirit | 200 |
| Cyclohexanone | 200 |
| Piperidine.pentamethylene.dithiocarbamate (17 Ce3 - PPD) | 50 |
| Green color pigment | 5 |
| $TiO_2$ |  |

After the printed sheet was rolled and allowed to sit for one night and day, it was heated to 180°–210° C in a foaming furnace. As a result, the printed portion of the sheet had a thickness of 0.6 mm, and the non-printed portion was 1.0 mm thick. The decomposition of the foaming agent was effected under normal conditions. The sheet obtained had a uniform and an aesthetically pleasing and excellent finish.

EXAMPLE 2

The following ingredients were blended in a cake mixer and a co-kneader.

|  | Parts By Weight |
| --- | --- |
| Vinyl chloride paste resin | 100 |
| Phthalic acid ester plasticizer | 40 |
| Phosphoric acid ester plasticizer | 20 |
| Epoxy resin plasticizer | 10 |
| Acrylonitrile-butadiene copolymer liquid rubber containing reactive terminals (POLY BDCN-15) | 20 |
| Ba-Ca-Zn system liquid stabilizer | 3 |
| Tin system liquid stabilizer | 2 |
| $TiO_2$ | 10 |
| Mineral spirit | 5 |
| Azodicarbonamide foaming agent | 5 |

The paste obtained was applied to an asbestos paper at a thickness of 0.5 mm to form a sheet. The sheet was heated in an oven at a temperature of 140°–150° C for 5 minutes so that the paste took on a semi-gelled state. The paper coated with the paste was then printed by a gravure printer using an ink containing the following ingredients.

|  | Parts By Weight |
| --- | --- |
| Vinyl chloride copolymer resin (Geon 400 × 150 ML) | 100 |
| Phthalic acid ester plasticizer | 30 |
| Phosphoric acid ester plasticizer | 10 |
| Epoxy resin plasticizer | 5 |
| Cd - Ba system stabilizer | 5 |
| Methyl-ethyl ketone | 200 |
| Mineral spirit | 200 |
| Cyclohexanone | 200 |
| 2,4 toluene diisocyanate | 30 |
| Green color pigment | 5 |
| $TiO_2$ | 10 |

After being printed and dried, the paper coated with the paste was rolled and allowed to sit for one night and a day. Thereafter, a thin film of the following composition was applied to the sheet.

|  | Parts By Weight |
| --- | --- |
| Vinyl chloride resin ($\bar{p}$ = 1000) | 100 |
| Phthalic acid plasticizer | 40 |
| Phosphoric acid plasticizer | 10 |
| Cd - Ba system stabilizer | 5 |

The assembly of the film and the printed sheet was heated in an air oven at a temperature of 190°–220° C for 3 minutes so as to cause foaming. As a result, the thickness of the assembly at the printed portions was 1.0 mm while that at the non-printed portions was 1.2 mm.

Azobis-isobutylronitriles and hydrazines also showed good results when used as foaming agents in the processes of this invention.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method for producing a foamed body having chemically embossed patterns which comprises: forming a composition containing a plasticized polyvinyl chloride resin, a synthetic rubber material capable of forming sulphur bridges, a blowing agent selected from the group consisting of dinitrosopentamethylene tetramine and azobisdicarbonimide, sulphur as the vulcanization agent and a curing asistant into a sheet; printing an ink containing a vulcanization accelerator selected from the group consisting of 2-mercaptobenzothiazole, the zinc salt of 2-mercaptobenzothiazole, the sodium salt of 2-mercaptobenzothiazole, tetramethylthiuram monosulfide, tetramethylthiuram disulfide, piperidine pentamethylene dithiocarbamate, zinc diethyl dithiocarbamate and zinc-dibutylxanthate onto said sheet in a desired configuration; drying and curing the printed sheet by heating said printed sheet to a temperature of 90°–100° C for at least 20 hours; and heating said dried sheet to a temperature of 180°–210° C to cause foaming of said sheet thereby generating a sheet having said chemically embossed patterns therein.

2. The method of claim 1 wherein said vinyl chloride resin preparation further contains at least one additive selected from the group consisting of stabilizers, lubricants and pigments.

3. An embossed foamed body prepared by the method of claim 1.

4. A method for producing a foamed body having chemically embossed patterns which comprises: forming a composition containing a plasticized vinyl chloride resin, a synthetic rubber material containing terminal groups capable of reacting with isocyanate functional groups, and a blowing agent selected from the group consisting of dinitroso pentamethylene tetramine and azobisdicarbonimide into a sheet; printing said sheet with an ink containing an isocyanate capable of reacting with said synthetic rubber into a desired configuration; drying said printed sheet at a temperature of 90°–100° C; and heating said dried sheet to a temperature of 180°–210° C to cause foaming of said sheet thereby generating a sheet having said chemically embossed patterns therein.

5. The method of claim 4 wherein said vinyl chloride resin preparation further contains at least one additive selected from the group consisting of, stabilizers, lubricants and pigments.

6. An embossed foamed body prepared by the method of claim 4.

* * * * *